United States Patent [19]

O'Toole et al.

[11] 3,760,116

[45] Sept. 18, 1973

[54] SENDER PULSE TIMING CONTROL

[75] Inventors: Gerald O'Toole, Elmhurst; Sergio E. Puccini, Wood Dale, both of Ill.

[73] Assignee: GTE Automatic Electric Laboratories Incorporated, Northlake, Ill.

[22] Filed: Jan. 3, 1972

[21] Appl. No.: 214,621

[52] U.S. Cl. .............................................. 179/18 J

[51] Int. Cl. .............................................. H04q 11/04

[58] Field of Search ........................ 179/18 J, 18 EB

[56] References Cited

UNITED STATES PATENTS 3,671,677 6/1972 Lee, Jr. et al. ................ 179/18 DA

*Primary Examiner*—Thomas W. Brown
*Attorney*—K. Mullerheim et al.

[57] ABSTRACT

The register-sender subsystem of a telephone switching system is of the type having common logic circuits including a wired program shared during cyclically recurring time slots by a plurality of register-senders, with each register-sender comprising a block of a common memory and having an associated register junctor serving as a peripheral unit for connection via a switching network to an outgoing trunk. The memory block for each register comprises a plurality of sets of storage elements including control sets and data sets which are accessed during sub-time slots. One of the control sets is a sender processor control set, which includes a timing store, a digit store, a dial pulse on-off control bit for controlling an outpulsing relay in the register junctor, and a multifrequency on-off control store for controlling a "time-on period" relay connecting a multifrequency sender output to the line. The timing store is used with common timing counters in the logic circuits for timing the pulse train generation for both dial pulse and multifrequency sending. Since the timing stores are in the individual memory of each register-sender, the pulse trains for different register-senders may be formed independently.

6 Claims, 10 Drawing Figures

SENDER CONTROLLER

SENDER PULSE TIMING CONTROL

BACKGROUND OF THE INVENTION

1. Field of the Invention

This invention relates to timing control of pulse trains used in sending digits in a communication switching system, and more particularly to such timing in a time division multiplex register-sender subsystem of a common control switching system.

2. Description of the Prior Art

There are known register-sender subsystems in which a number of peripheral units which include sending apparatus are connected to outgoing trunk circuits, and which share common logic circuits and a memory on a time division multiplex basis. In such systems each peripheral unit has an individual block of memory for storage of digits and control information, and a timing generator supplies cyclically recurring pulses with a time slot for each peripheral unit. During each time slot the peripheral unit has exclusive use of the common logic circuits which are then effectively connected to the peripheral unit, and the information from the memory is read, processed and rewritten. In some cases the time slot may be assigned to the peripheral unit only during a call or a portion of a call. A typical time division multiplex register-sender arrangement for a communication switching system common control arrangement is shown in U.S. Pat. No. 3,301,963 issued Jan. 31, 1967 to D.K.K. Lee et al.

In such time division multiplex arrangements it has been the usual practice to provide a common pulse train generator or generators for simultaneous use by all of the senders. For example, a dial pulse generator comprises a continuous train of 10 pulses per second of 40 milliseconds and 60 milliseconds corresponding to the make and break intervals of a dial pulse train, and multifrequency pulse generator provides a continuous train of intervals of 70 milliseconds on and 70 milliseconds off. For example see said Lee et al. patent FIGS. 55 and 77. while such an arrangement using common generators efficiently provides the timing for the sender pulse trains, and makes common adjustments of the duty cycle possible, it has the disadvantage that the output pulse train from all of the senders are in synchronism. One result would be that if several senders are simultaneously out-pulsing to the same step-by-step office, then the switches in the other office would operate in synchronism with obvious undesired effects in the drawing of current from the common battery, along with other undesirable results.

SUMMARY OF THE INVENTION

The object of this invention is to provide a time division multiplex arrangement for senders in which the output pulse trains are not synchronized to common generators.

According to the invention the individual block of memory which is individually associated with a sender during a call includes a sender control set of storage elements, comprising a timer store, a digit store, and an on-off control store; with the timer store used to time the intervals forming sender pulse trains. The on-off control store information indicates whether the pulse train is in an on or off interval, and the common logic circuits use this indication along with the decoded timing information from the timer store to change the state of the on-off control store information in accordance with the proper characteristics for the pulse train.

In particular for dial pulse sending, the on-off control store information is used by the common logic circuits to supply a signal to an outpulsing relay in the appropriate peripheral unit to control the state of a relay whose contacts open and close the outgoing loop, sending the number of pulses corresponding to the value of the digit; and then another indicator store of the sender control set in conjunction with the timing information provides the required interdigital pause, during which another digit is loaded into the digit store for sending.

For multifrequency sending a different on-off control store of the sender control set is used which in conjunction with the timing store information provides alternate 70 millisecond on and off intervals, with the logic circuits providing a signal during the on interval to operate a relay to connect the sender output to the line, while at the same time the information from the digit store is supplied to a sender to provide the two-out-of-six multifrequency tones.

Advantages of this arrangement using a timer store in memory for each sender, in addition to having the pulses for different senders start at different times, include not requiring an individual buffer store for each sender. Also it is possible to have different interdigital times for dial pulse calls; for example 300 milliseconds for calls to common control offices and 600 or 700 milliseconds for calls to direct control offices.

CROSS-REFERENCES TO RELATED APPLICATIONS

The invention claimed herein is disclosed in U.S. Pat. application Ser. No. 201,851 filed Nov. 24, 1971 by S. E. Pucinni for a Data Processor With Cyclic Sequential Access To Multiplexed Logic And Memory, hereinafter referred to as the Register-Sender patent application. However, applicants of the present application are the inventors of the matter claimed herein, which was disclosed to the applicant of the REGISTER-SENDER patent application during the design of the subsystem.

DESCRIPTION OF THE PREFERRED EMBODIMENT

The subsystem in which the invention is incorporated in described in said REGISTER-SENDER patent application. FIGS. 2–7 herein correspond to figures in that application, which may be referred to for further description. The time division multiplex arrangement of the register-sender control apparatus is described in detail therein.

Figure 1:
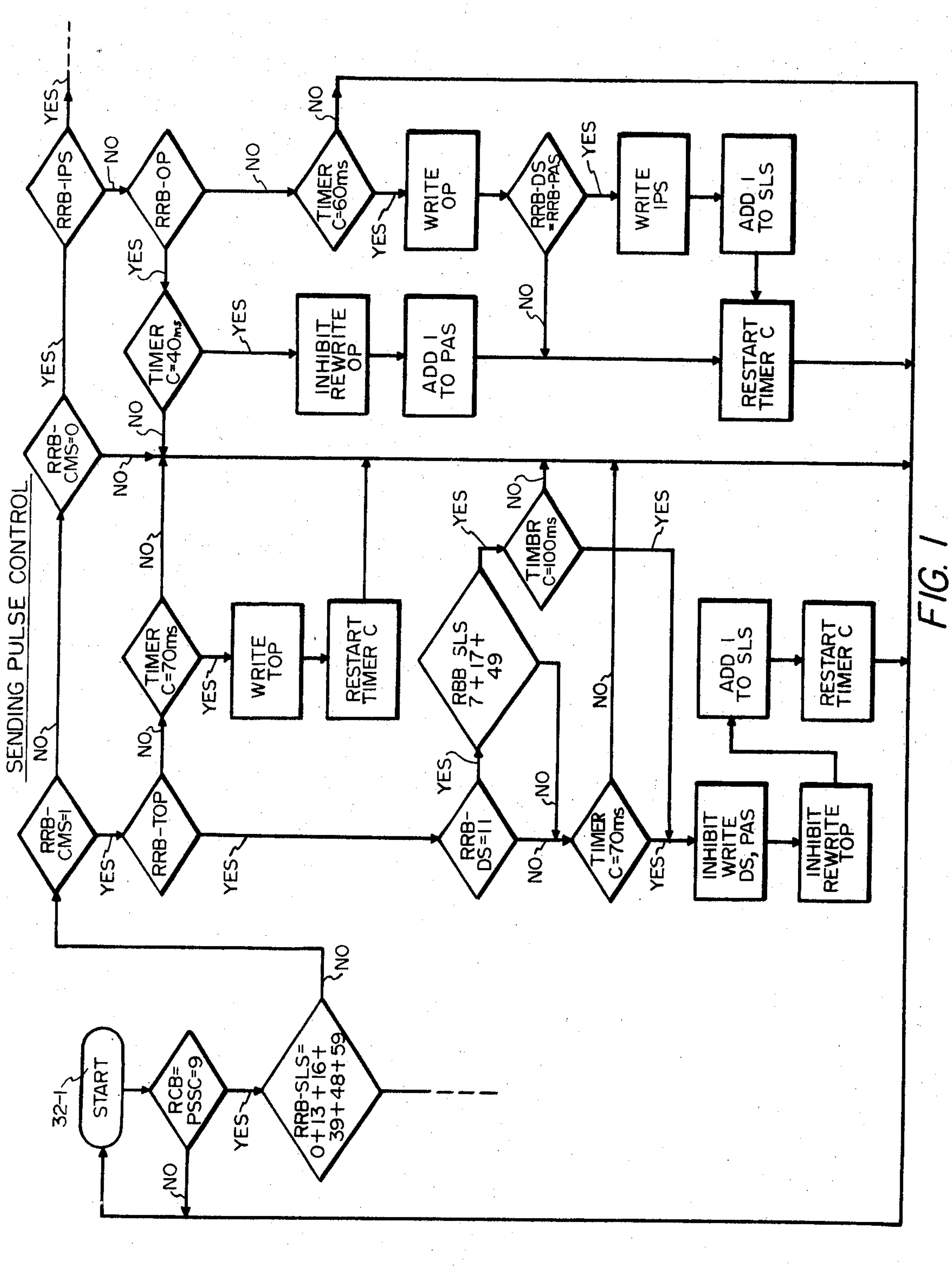
FIG. 1 is a flow chart showing the principle of the invention.

The flow chart of FIG. 1 shows the operation for control of the pulse train generation for sending, for multifrequency sending following the "yes" branch of the decision block RRB—CMS=1, and for dial pulse sending following the "yes" branch of block RRB—CMS=0 and the "no" branch of block RRB—IPS. In both cases a timer C is used to determine the time for the on and off intervals of the pulse trains. The on-off control indicator for multifrequency sending is TOP and for dial pulse signaling is OP. The digit store for the current digit being sent is identified in both cases by store DS. The operation corresponsing to this flow chart will be described after a description of the apparatus involved with reference to the other figures of the drawing.

Figure 2:
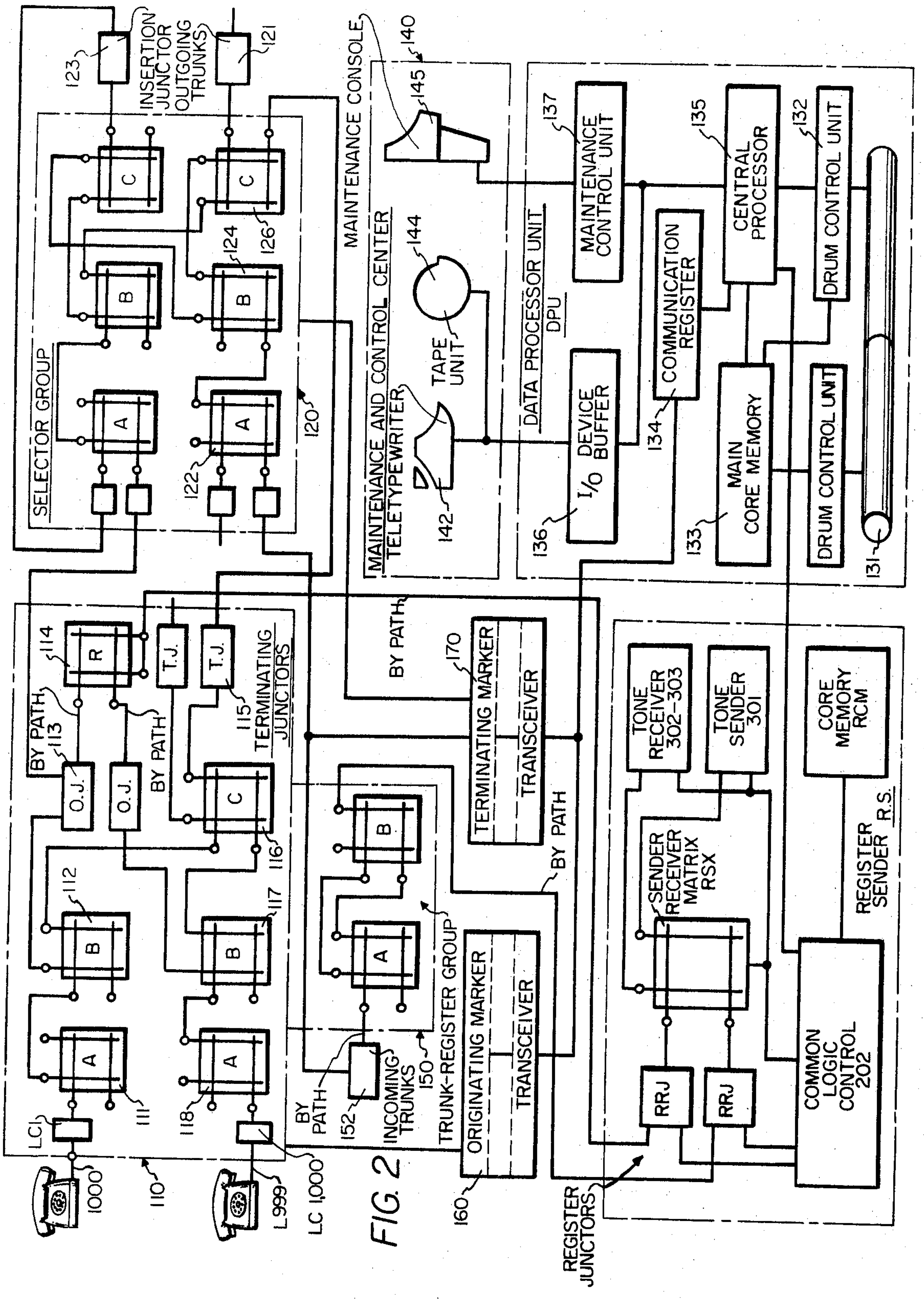
FIG. 2 is a block diagram of a communication switching system incorporating the preferred embodiment of the invention.

The preferred embodiment of the invention is incorporated in a register-sender subsystem of a telephone switching system as shown in FIG. 2. The register-sender subsystem RS includes common logic control circuits 202 which are shared on a time division mlultiplex basis by a plurality of register junctors RRJ. The register junctors serve as peripheral units to receive incoming data information in the form of dialed digits, and output information in the form of certain digital control signals and digits for outpulsing to other offices. The register-sender subsystem includes a core memory RCM which has 16 word stores individually assigned to each register junctor. Timing control signals are supplied from a timing generator in repetitive cycles, with each register junctor having one time slot per cycle, the time slot timing signals being designated by a prefix Z followed by the junctor number. The time slots are divided into sub-time slots designated by a Y prefix; there being eleven sub-time slot signals designated Y1 through Y11. The memory access arrangement is such that the two words are read during a sub-time slot, the information is processed by the common logic circuits, and then these two words are rewritten. The combination of two words stores of memory which are accessed during the same sub-time slot are designated herein as a row of memory. The area of memory comprising eight rows (16 words) individually assigned to one register junctor is referred to as a block of memory.

Figure 7:
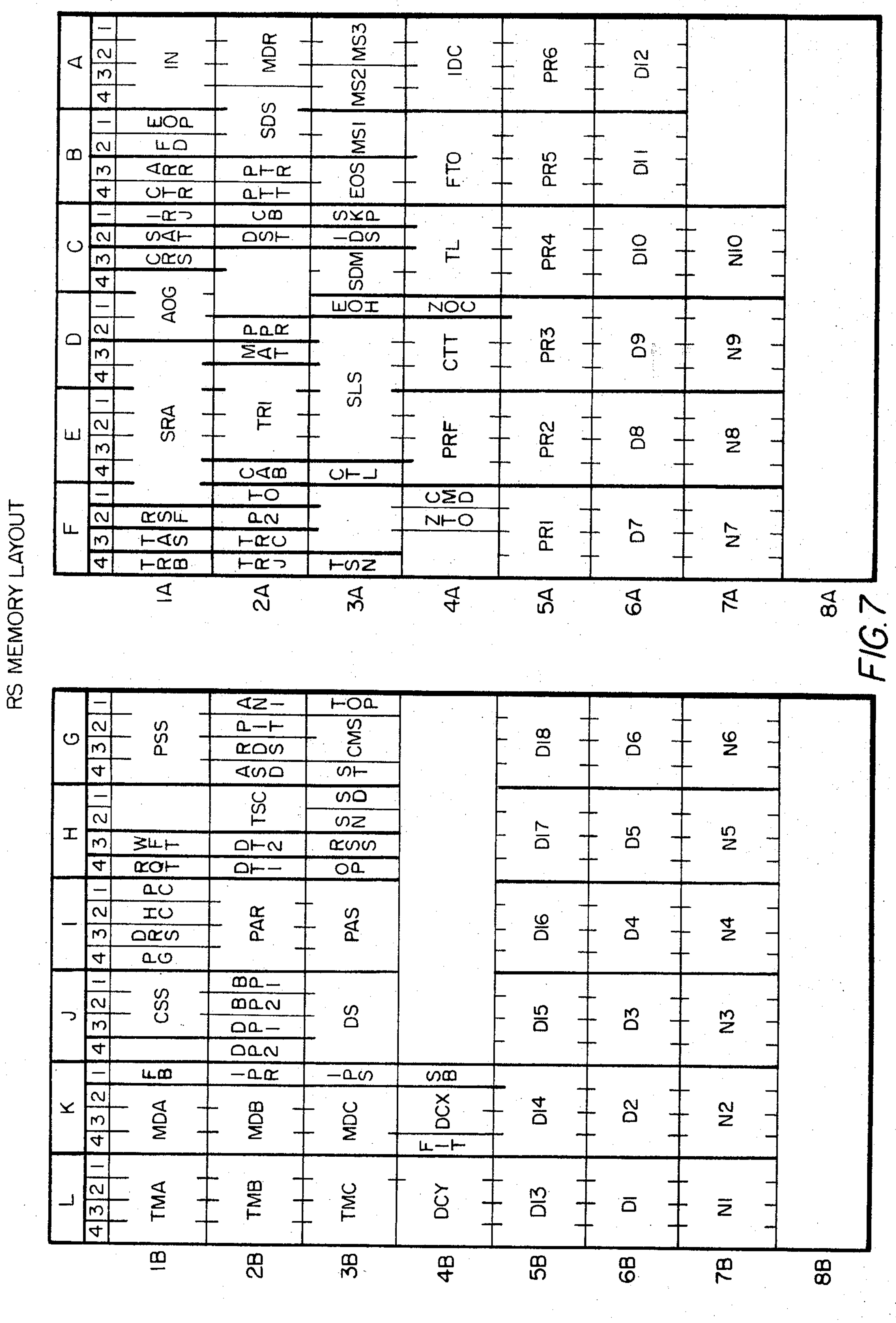
FIG. 7 is a layout diagram of the storage area in memory for one register.

The memory layout for one block is shown in FIG. 7. Each word store of the memory comprises 26 cores of which 25 are used for bits of call information. As shown in FIG. 7 the two word stores for each row are designated A on the right and B on the left respectively, and each is divided into six positions of four bits each, the positions being designated A–F in word A and G–1 in each word B, with the bits numbered 1–4 in each position. Row 1 is used for process control information, row 2 for register control information, row 3 for sending control information, row 4 for translation control and miscellaneous information, rows 5 and 6 for prefix and called number digits, row 7 for calling number digits, and row 8 is a spare.

The scan organization provides for three different modes of scanning. In each mode the first three rows are control rows which are accessed twice during each time slot, row 1 being accessed during sub-time slots Y1 and Y9, row 2 during sub-time slots Y2 and Y10, and row 3 during sub-time slots Y3 and Y11. Row 4 is accessed in every mode during sub-time slot Y4. In mode A rows 5 and 6 are accessed during sub-time slots Y5 and Y6, and then the scan jumps to Y9. In mode B the scan of rows 5 and 6 is skipped so that rows 7 and 8 are accessed with sub-time slots Y7 and Y8 following sub-time slot Y4. Mode C is used for maintenance purposes and uses all 11 of the sub-time slots in sequence, thereby providing a longer than normal time slot interval. Mode A is the normal mode used while receiving or sending called number digits, mode Mode B is used for receiving or sending calling numer identification digits for the processing of a call.

GENERAL SYSTEM DESCRIPTION

The telephone switching system is shown in FIG. 2. The system is disclosed in said REGISTER-SENDER patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140.

The register-sender RS provides for receiving and storing of incoming digits and for outpulsing digits to distant offices, when required. Incoming digits in the dial pulse mode, in the form of dual tone (touch) calling mlultifrequency signals from local lines, or in the form of multifrequency signals from incoming trunks are accommodated by the register-sender. multifrequency group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302—303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register=junctors RRJ. The information is stored in the core memory RCM on a time division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register-sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

Typical Calls

This part presents a simplified explanation of how two basic call types are processed by the system. The following call types are covered in the order listed: (1) call from a local party served by one switching unit to another local party served by the same switching unit, and (2) call from a local party served by a switching unit destined for a party served by a distant office, via an outgoing trunk.

In the following presentations, reed relays are referred to as correeds. Not all of the data processing operations which take place are included.

Local Line-to-Local Line Call

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulsing highway.

The data processor unit, upon being informed of a call origination, enters the originating phase, following which it informs the register-sender that an origination has been processed to the specified register junctor.

Upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

After a tone receiver connection (if required), the register junctor returns dial tone and the costomer proceeds to key (touch calling telephone sets) or dial the directory number of the desired part. (Part test on ANI lines is performed at this time.)

The register junctor pulse repeating correed follows the incoming pulse (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function - the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that register) in the data processor core memory is returned to idle.

Local Line-to-Outgoing Trunk Call

The processing of a call originated by a local customer, but destined for a distance office, is handled the same as previously described for a "local-to-local" call up to the point where a three-digit translation has occurred. The digits are analyzed and it is determined that the call destination is not a local line. Operation from this point forward is described in subsequent paragraphs.

For this example, the call is originating from a rotary dial line. The customer is making a seven-digit EAS (extended area service) call requiring tandem switching through the connecting office. The connecting office is equipped for wink-start pulsing. The trunk to the connecting office is an E and M trunk requiring D.C. pulsing.

The routing information and the class of the calling party allows the data processor to determine all register-sender instructions necessary to forward this call toward its destination.

The data processor writes the sending requirements into the register-sender core memory fields. These include the following information and instructions for this example: (a) early outpulsing of all digits received, (EOP field is set), (b) when seven digits are received, dialing is finished (TL field is set equal to 7), (c) close terminating loop in the register junctor, and (d) working with the terminating marker. There are also other instructions relating to start signals, send mode, etc.

The network switching instruction is sent to the terminating marker via the communication register. The marker then makes various tests, selects a selector outlet, and completes a path thereto. When the marker recognizes that the path has been connected properly, it clears from the matrix and sends a message to the data processor indicating successful call completion, and the identity of the trunk that was used.

The data processor will place this information in the call history table and write into register-sender core memory that outpulsing may proceed when start signals have been received. When the distant office is prepared to receive digits, it will return an off-hook signal of approximately 150 milliseconds which the outgoing trunk converts to a ground on the S lead. This causes the stop dial (SD) relay in the register junctor to operate. At the end of the 150-millisecond period, the SD relay restores and outpulsing begins.

The register-sender will outpulse the digits accumulated at this point (early outpulsing) and will outpulse each additional digit as it is received from the customer (no digits are deleted or prefixed in this example). When seven digits have been accumulated and sent, the register-sender will signal the originating junctor to switch through.

The register junctor will release itself from the call, releasing the R matrix. The register-sender memory is cleared, and the call history table in the data processor is reset. The calling party now controls the outgoing trunk. When the called party served by the connecting office answers, they may begin to converse. The calling line is now connected to the connecting office via the line matrix, originating junctor, selector matrix, and outgoing trunk.

When the calling party disconnects, the outgoing trunk releases the selector matrix, releasing the originating junctor and line matrix. Release of the line cut-off correed idles the customer's line for future calls.

The outgoing trunk remains busy for a short time to insure release of the connecting office. It then returns to idle.

Register-Sender Subsystem

Figure 3:
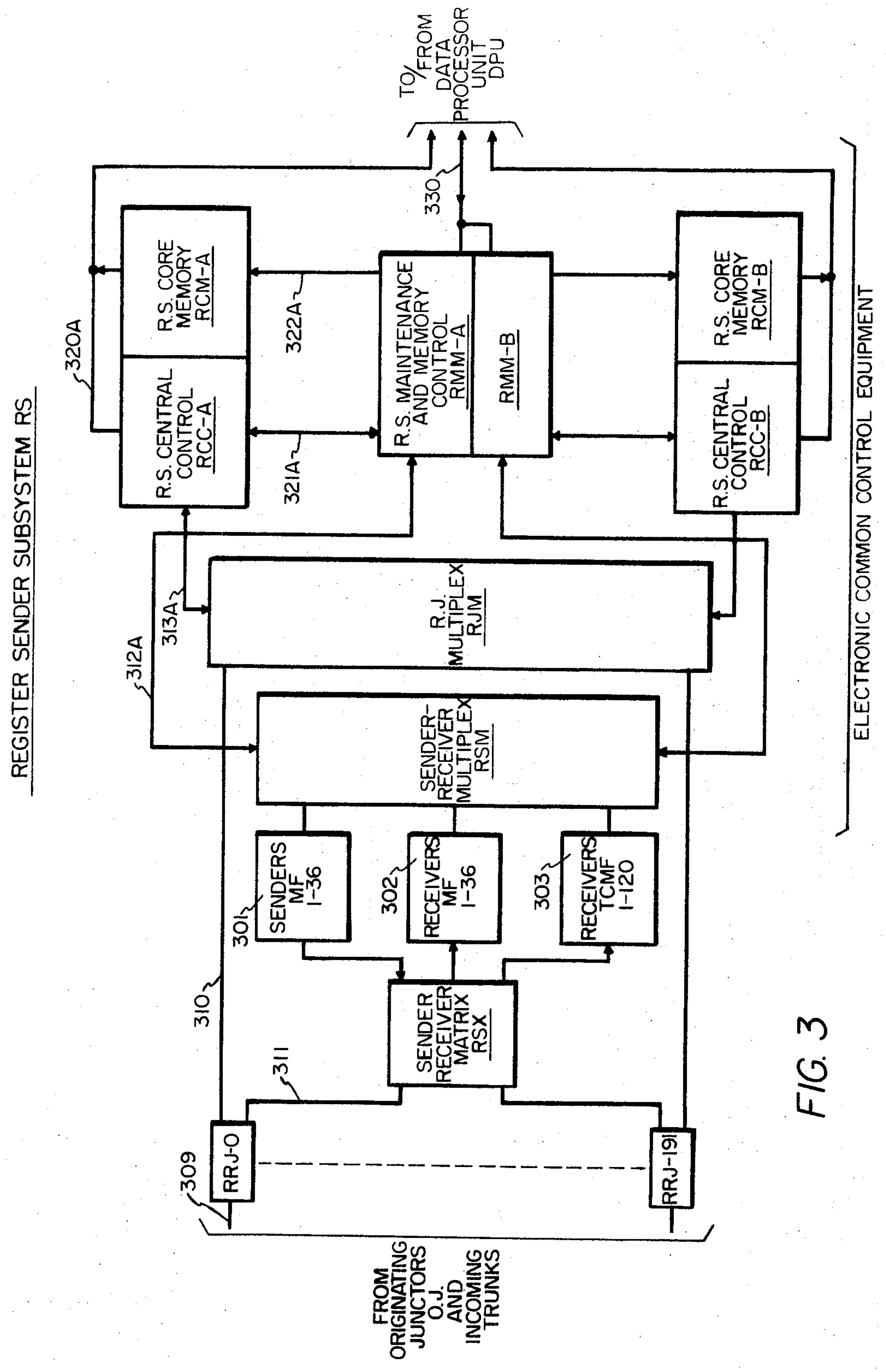
FIG. 3 is a block diagram of the register-sender subsystem.

Referring to FIGS. 2 and 3, the register-sender RS is a time-shared common control unit with the ability to register and process 192 calls simultaneously from local lines or incoming trunks. The register-sender RS provides the electronic time-shared register apparatus for receiving and storing incoming digits, and pulse generating sender circuitry to forward a call toward its destination. In this regard, the register-sender RS generally includes a plurality of register junctors PRJO–RRJ191 which are space-divided electromechanical access circuits for providing an interface between the switching matrices of the system and the time-shared register apparatus, which includes the electronic logic of a common logic control 202, a ferrite-core memory RCM to store digits to be received and sent via the register junctors RRJ, and supervisory information pertaining to the call under the control of the common logic control 202. A sender-receiver matrix RSX selectively connects a plurality of tone receivers and senders 301–303 to the register junctors RRJ for signaling modes other than the dial pulse mode which is provided for by the register junctors RRJ.

The time-shared common logic control 202 of the register-sender is duplicated and runs identical operations in synchronism with one another. Under normal conditions, both sets of time-shared equipment are partially active, one set serving one-half of the register junctors RRJ and the other set serving the remaining half of the register junctors RRJ. In case of equipment faults, either set of time-shared equipment can serve all of the register junctors RRJ.

The space-divided equipment of the register-sender includes the register junctors RRJ, the senders and receivers, and the sender-receiver matric RSX. The register junctors RRJ with their associated multiplex equipment RJM provide an interface between the space-divided matrix outlets connected to the register junctors RRJ and the time-shared common logic control 202. The sender-receiver matrix RSX provides a metallic path from the register junctors RRJ to the tone senders and receivers under the control of the common logic control 202. The senders 301 provide for sending in the multifrequency mode, and the receivers provide for receiving in either the touch-calling multifrequency mode from the local lines or the multifrequency mode from the incoming trunks 152.

The register junctors RRJ are the entry and exit point of the register-sender for information transferred between the switching network and the register-sender. The register junctors enable the register sender to provide the following features: dial pulse receiving and sending, coin and party testing, line busy, dial tone, and reorder tone application. The incoming and outgoing matrix paths are held by the register junctors RRJ during call processing. The register junctors comprise electromechanical components for compatibility with lines, trunks, and switching network circuits, however they also include electronic interfacing circuits which are similar to those in the markers for compatibility with the electronic common logic control 202. Signals from lines, trunks, and network circuits are received by the register junctors and forwarded to the common logic control for processing.

The common logic control 202 contains the control logic for call processsing by the register sender 200. The purpose of the common logic control 202 is to perform all functions associated with receiving, sending, and timing of digits, and to control processing of calls by generating commands for other circuits in the register-sender and for the switching network. Since the common logic control 202 operates on a time-shared basis to store call processing information in the memory RCM, the common logic control 202 has the ability to register and process 192 simultaneous calls. The common logic control works closely with the core memory RCM which together form the register apparatus of the present invention, and which provides storage of information concerning the calls in progress and information relating to the data processor unit 130.

The core memory RCM is a conventional ferrite core memory, which need not be disclosed in detail. The memory RCM automatically restores the information in the same cores after a read operation, and it likewise automatically clears the information from the cores immediately prior to writing information into them. It is to be understood that the memory RCM could also be any suitable type of non-destructive read-out memory.

The common logic control 202 of FIG. 2 includes duplicated pairs of electronic logic units. As shown in FIG. 3 the common logic comprises a duplicated pair of central control units RCC-A and RCC-B, duplicated core memories RCM-A and RCM-B, and a maintenance and memory control which comprises a duplicated pair of units RMM-A and RMM-B. The units are provided in duplicate for reliability purposes, and each of the duplicated units functions independently as described hereinafter in greater detail. The central control units are connected to the register junctors via an RJ multiplex unit RJM, and the senders and receivers 301-303 are connected to the maintenance and memory control unit via sender-receiver multiplex unit RSM. The central control unit RCC-A along with core memory RCM-A comprises one frame of equipment, and similarly the units RCC-B and RCM-B are another frame of equipment, while the maintenance control units RMM-A and RMM-B together comprise a frame. The multiplex units each comprise several frames of equipment. The different frames are interconnected via cables which together with driver and receiver circuits terminating them form DC links between the frames.

Figure 4:
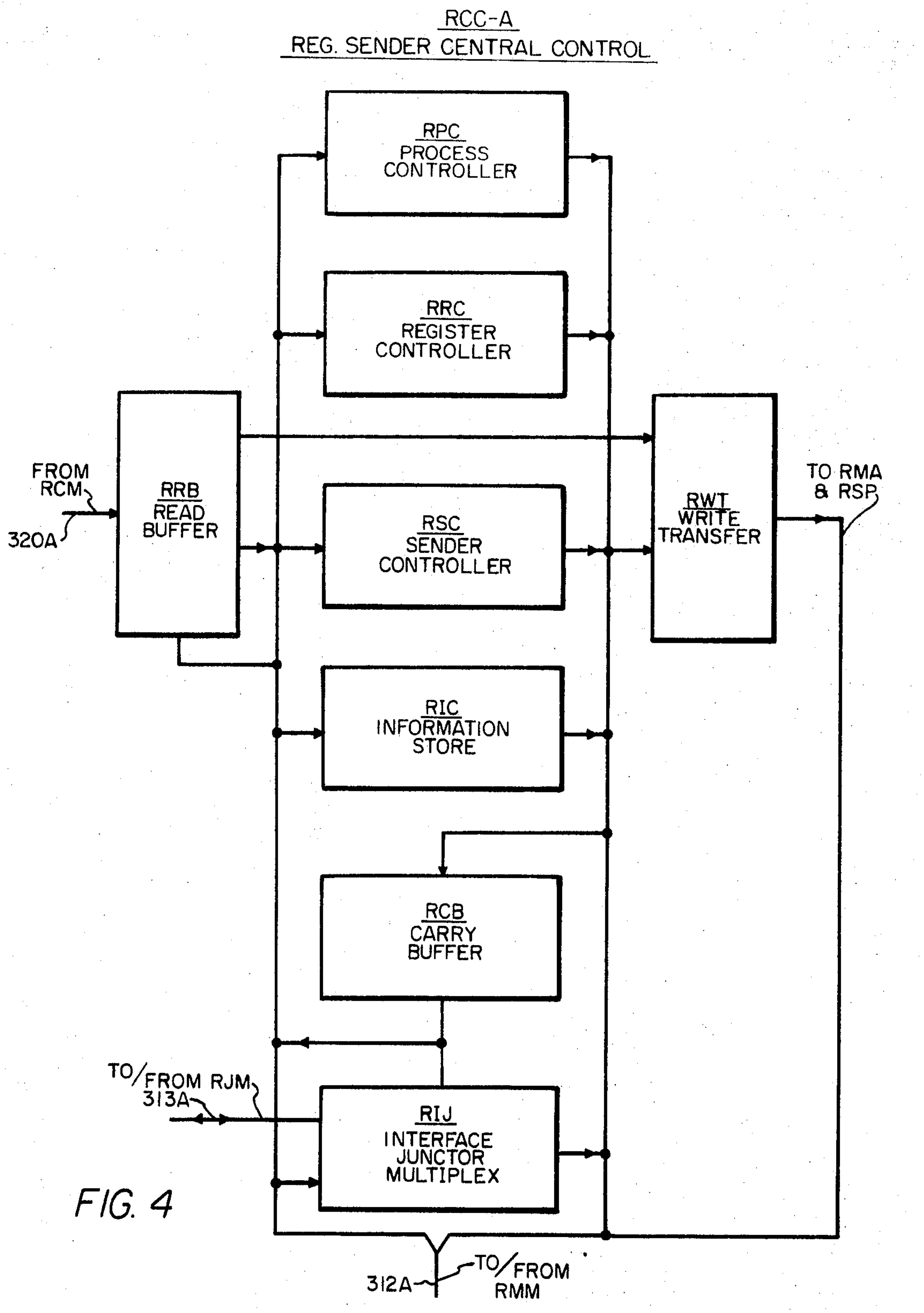
FIG. 4 is a more detailed block diagram of the central control portion of the register-sender subsystem.

The circuits of the frame RCC-A are shown in the block diagram of FIG. 4.

The read buffer RRB is a 52-bit register. This circuit is used for temporary storage of two words from a row of the register core memory. The registers are latch circuits that make the data available to the controller circuits, the carry buffer circuits, and the write transfer circuits. The latches correspond to the positions of memory, and are designated RRB–A1 through RRB–L4.

The write transfer circuit RWT comprises 48 bit selective input devices. There are eight pairs of inputs and a clear memory circuit used to present data to the memory access circuits RMA. The write transfer circuits RWT can have as its source the different controllers shown in FIG. 5, the read buffer, and for clear memory the carry buffer RCB. The outputs from the write transfer circuit RWT are multiplexed with other sources by circuit RMA for writing into the core memories RCM.

The process controller RPC is used to control the process of a call. This unit takes information from the first row of a core memory block and information from the register junctors via the multiplex circuit RJM and RIJ. The controller RPC furnishes much of its data to the carry buffer RCB for controlling other memory word operations. Changes of this processing information are restored to the memory during sub-time slot Y9. The RPC processor also generates the call processing interrupts to the data processing unit.

The register controller RRC is used to manipulate register junctor information, primarily for call origination functions. This unit takes its information from row two of the memory or from the carry buffer RCB. The processor RRC controls the dial tone application, party testing, digit reception, and start dial signal controls. The results of the data from the RRC processor are used for manipulation in other controllers via the carry buffer RCB, for origination identification from the register junctors via the multiplex circuits RJM, via the multiplex circuits for digit reception, or is written back into memory for storage and later use.

The sender controller RSC is used to manipulate register junctor information primarily for call termination and sending functions. The processor RSC deals with information found in row 3 of the memory. This controller contains information as to start dial signals, method of digit sending, the digit being sent and the pulse count that has been sent of pulse digit; and the sequence of digit sending as to prefix digits, called number and calling number information.

The information storage controller RIC is used for data manipulation in rows 4, 5, 6, 7, and possibly 8 of the memory. The information that is handled consists of digit loading, shifting, retrieval and pattern recognition to and from appropriate places in core memory. Further data is used to set up special actions when particular conditions are recognized.

The carry buffer RCB is a series of latch circuits. There are 60 carry buffer latches. The majority of these latches are used to transfer bits of information from one call processing controller to another controller during different sub-time slots of a time slot period. The normal carry buffer information is not carried over from one time slot to another with exception of the BY latch, which indicates that a sender or receiver connection is in progress and prevents any other from attempting a connection until completion of the first.

The interface junctor multiplex unit RIJ operates with the junctor multiplex circuits RJM of FIG. 3 for multiplex to and from the register junctors.

Register Timing Generator

Figure 6:
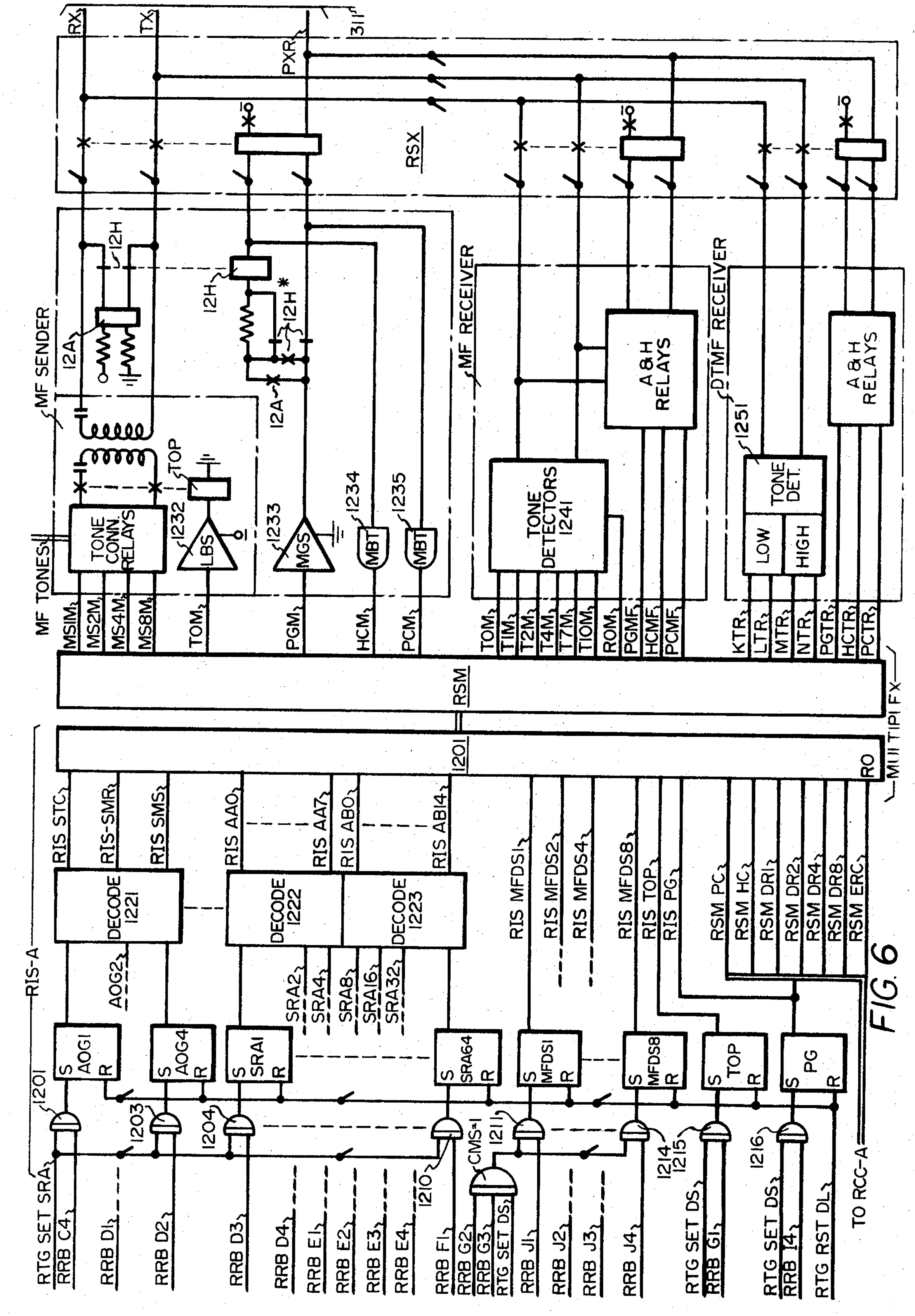
FIG. 6 is a diagram showing the multiplex circuits for the senders and receivers.

The register timing generator RTG is shown by a functional block diagram in FIG. 6 of the REGISTER-SENDER patent application.

A 10-megahertz system clock SC is used for the register-sender subsystem as the source for timing pulses.

A W generator is an 11-flip-flop ring counter, having respective outputs W1 through W11. The W generator uses the 10-megahertz clock SC for its source. Each output pulse from the W generator has a duration of 100 nanoseconds and a cycle rate of 1.1 microseconds.

An X generator is a five-flip-flop ring counter, having respective outputs X1 through X5. The X generator uses the signal on lead W11 as its source. Each output pulse has a duration of 1.1 microseconds with a cycle rate of 5.5 microseconds.

A Y generator comprises three-flip-flops YA, YB and YC, and a separate count modification flip-flop YCM. The Y generator can operate in three count modes. Mode A allows decodes of signals on output leads Y1 through Y6 and Y9 through Y11, mode B permits decodes on output leads Y1 through Y4 and then Y7 through Y11, and mode C provides decoder outputs on Y1 through Y11. The drive circuit for the Y generator is derived from the signals on leads X5 and W11. The mode of the Y counter is determined by the logic and maintenance unit circuits. The direct outputs of the flip-flops YA, YB and YC provide signals on the memory address leads MA1, MA2 and MA3 respectively.

A Z generator is an eight-flip-flop binary counter with three-flip-flops as ZA, three-flip-flops as ZB, and two-flip-flops as ZC. These flip-flops have respective outputs connected to memory address leads. The outputs from ZA are decoded as signals on leads ZA0 through ZA7, those from ZB on the outputs ZB0 through ZB7, and those from ZC on leads ZC0, ZC1 and ZC2. The Z counter is advanced by the output of an AND gate having inputs on leads Y11, X5 and W11. There are 202 steps of the Z generator 0 through 201, and the cycle time is basically 10 milliseconds.

The timing generator RTG also includes several latches for supplying set and reset control signals to other latches of the common logic and multiplex circuits.

The timing generator also includes a 100 millisecond timer ITT and a timer LTT. The timer ITT is a four-flip-flop binary counter, clocked by the decode of output 201 from the Z generator and upon reaching a binary count of 10 is reset. The one second timer LTT is a four-flip-flop binary counter which is clocked by the decode of output 10 from the 100 millisecond timer and upon reaching a count of 10, resets itself.

The timing relationship of the outputs of the register timing generator are shown in graphical form in FIG. 7 of the REGISTER-SENDER patent application. The timing can be summarized as follows:

a. A 10-millisecond system cycle time;

b. The overall cycle (10ms) divided into 202 time slot pulses Z000–Z201 (49.5 microseconds each), 192 of which are used for call processing and 10 of which are reserved for maintenance purposes;

c. Each time slot pulse divided into 11 sub-time slot pulses Y1–Y11 (5.5 microseconds each), nine of which are utilized during each time slot pulse of normal call processing, depending on the mode.

d. Each sub-time slot pulse divided into 55 pulses (0.1 microseconds each) comprising five pulses X1–X5 of 1.1 microseconds each, each divided into 1 W pulses W1–W11 of 0.1 microseconds each. The 55 combinations of X and W timing pulses can be utilized for accessing the memory and different logic circuits during various different times of a single sub-time slot.

Note that the memory address comprises 12 bits of which bits MA4–MA11 designate the Z time slot corresponding to a particular register junctor, bits MA1, MA2 and MA3 designate a particular row of memory of the eight rows assigned to a register junctor and the right or left hand word store of a row is determined by a bit MA0 which is obtained from a flip-flop in the register priority and interrupt circuit RPI. Note from the sub-time slot decoding arrangement that sub-time slots Y9, Y10 and Y11 have the same memory addresses respectively as sub-time slots Y1, Y2 and Y3; and that the decoded outputs are differentiated by the fact that flip-flop YCM is in the set condition for sub-time slots Y9, Y10 and Y11. The binary designation in the decoding block shows the least significant bit MA1 on the right, and the state of YCM on the left.

Symbolism For Gates And Bistable Devices

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bistable device. The logic also used bistable devices in the form of JK flip-flops implemented with integrated circuits.

Relay units such as the register junctors include interface circuits for signals to and from the electronic frames. These interface circuits are relay drivers and test gates as shown for example at the bottom of FIG. 5. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in a saturation to a relay; those designated FRS are fast-release relay switches comprising two transistors such that when a true signal is applied to the input the two output leads from the collectors of two transistors connected to the two sides of the relay winding supply a low impedance path to operate the relay; and those designated LBS for low current battery switch comprise a single transistor which when a true signal is applied at the input supply a low impedance path including the collector-emitter path to operate the relay. The contact gate designated by CTG is a circuit which when ground is supplied via relay contacts at its input supplies a true signal at its output.

Register Junctor And Originating Path

Figure 5:
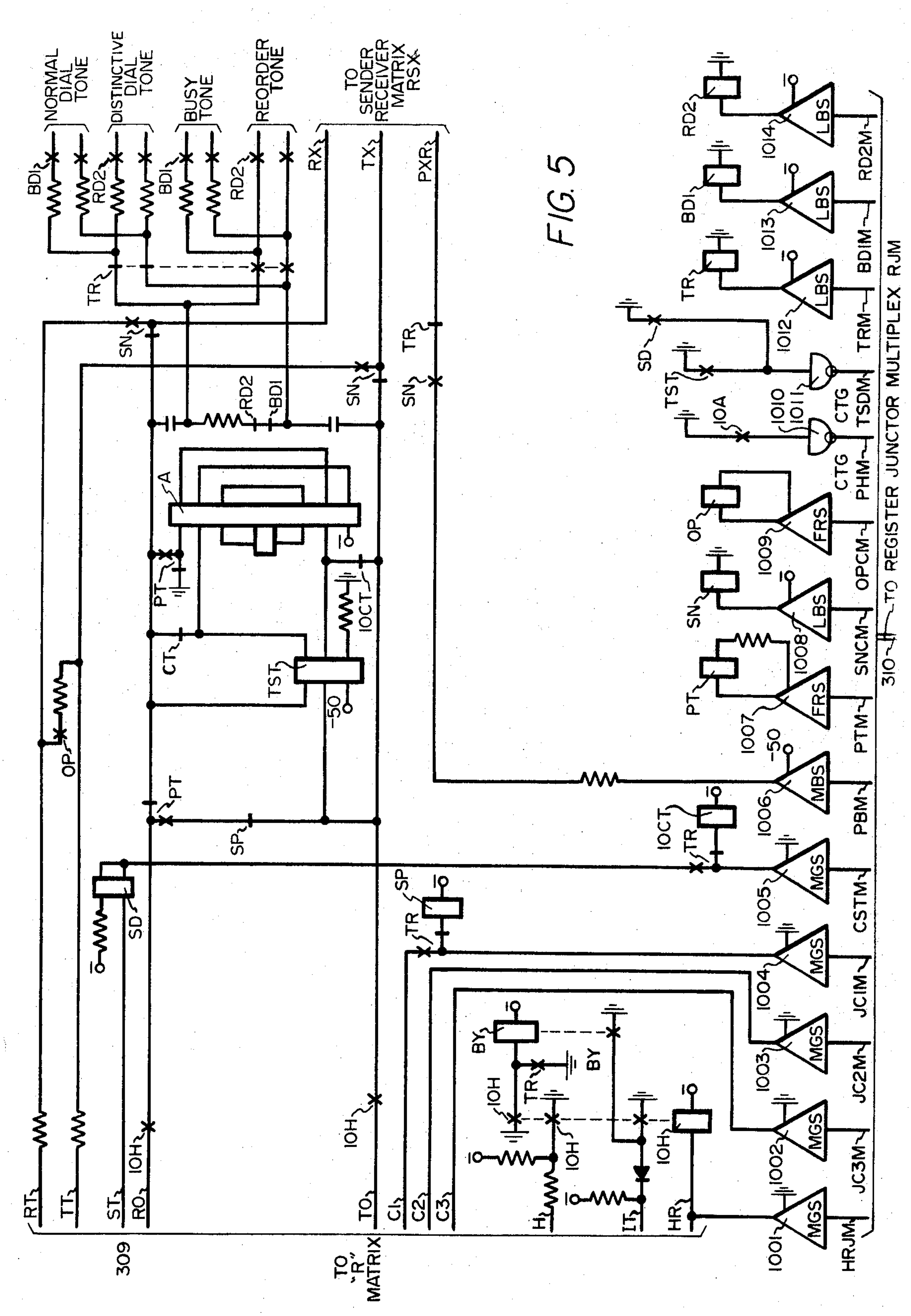
FIG. 5 is a schematic and functional block diagram of a register junctor.

A diagram of a register junctor RRJ-0 is shown in FIG. 5.

The register junctor's function is the interface between the subscriber lines and incoming trunks, and the time-shared circuits of the register-sender. The register junctors are used for digit receiving or sending, tone application, a battery feed device to the calling station, party and coin testing, busy and idle indication to the originating marker, and as a source of hold for the matrix path.

There are two types of register junctors; the local register junctors used with the R stage outlet to subscriber lines and paystations, and incoming register junctors used with incoming trunks and having less complexities than the local register junctors.

The register junctor RRJ–0 shown in FIG. 5 is a local register junctor. Some of the relays are described below, and all of them are described in the REGISTER-SENDER patent application.

Relay TR is a HQA relay which is activated during sequence states PSS=6 or greater via relay driver 1012. When operated this relay disables the path for dial tone and enables the busy and reorder tone paths, removes relay CT from the circuit and prepares a path for relay DS, removes relay SP from the circuit and prepares a path for lead C1 to the originating trunk circuit, maintains relay BY operated and opens a path from the sender-receiver pull battery switch 1006 via lead PXR to the matrix. This last set of contacts is a protection feature to insure that a multiple path is not pulled in the matrix should the main battery switch 1006 fail.

Relay SD is a mercury wetted reed relay. This relay (start dial) has two functions in the call process. First it recognizes that the terminating marker has seized the outgoing trunk or terminating junctor and it also receives start dialing commands from the distant office. Then the terminating marker seizes an "S" relay of the trunk or terminating junctor, relay SD is also operated. Contacts of this relay operate a test gate 1011 to send a logic signal to the register-sender central control via lead TSDM. In response thereto a signal on lead CSTM operates relay driver 1005 to relay SD. When the terminating marker releases, relay SD drops, but the S relay of the terminating junctor or trunk is held by the ground from relay driver 1005. When a distant office signals with a start dial (or stop dial if sending is in progress) a ground is received on lead ST causing relay SD to operate. When the distant office causes the start/stop dial to cease, relay SD releases to supply a signal to the register-sender common logic.

Relay OP is a mercury wetted reed relay which has three functions. First it is operated while making a sender or receiver connection. When contacts of relay OP close an A relay in the sender or receiver operates to check continuity of the tip and ring paths. Second, the relay operates during operation of a terminating marker connecting to an outgoing trunk so that the terminating marker can make a continuity check. And lastly this relay is operated and released to send dial pulsing signals. Energizing and releasing the relay causes a path via the tip and ring to alternately short and open.

Relay SN is an HQA relay which has two functions. First it is operated during the connection of a sender or receiver. One set of contacts close to connect the pull relay driver main battery switch 1006 to lead PXR to the matrix during connection. The other purpose is to connect an MF sender to the terminating tip and ring conductors and isolate the originating and terminating tip and ring paths within the register junctor.

An incoming register junctor is similar to the local register junctor described above except that relays TST, 10CT, PT, RD2, and SP are omitted.

Multiplex To Register Junctors

A portion of the multiplex circuits between the register junctors and frame RCC is shown by a functional block diagram in FIG. 11 of the REGISTER-SENDER patent application, which relates to the block diagram shown in FIG. 3. A portion of the multiplex circuits are in the unit RJM shown in FIG. 3, and a portion are in the unit RIJ shown in FIG. 4. In unit RJM the circuits are divided into eight groups designated 0 through 7, each group serving 24 register junctors. The connections between the groups in RJM and the unit RIJ are via conductors in the set of cables 313A, which comprise DC links having cable drivers at the input end and cable receivers at the output end. The junctor multiplex circuits RJM are shown in simplified form in FIG. 10 herein. The time slot signals for RRJ-0 are simplified to show Z000 in place of ZA0, ZB0 and ZC0, and the address selection gating is simplified to gates 91 and 92.

Figure 10:
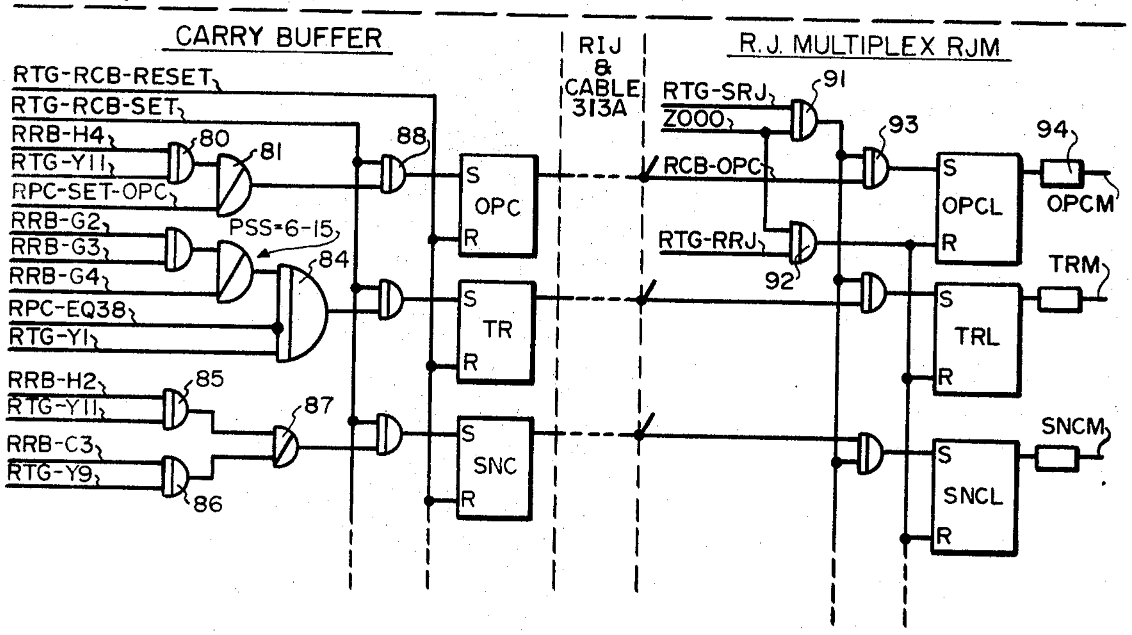
FIG. 10 is a functional block diagram of a portion of the carry buffer, and a corresponding portion of the register junctor multiplex circuits in simplified form.

The connection between unit RJM and each register junctor includes special interface circuits including electronic devices and chokes, these circuits being shown in FIG. 10 by blocks such as 94 control leads to the register junctor. For each register junctor there are two scan leads PHM and TSDM shown in FIG. 5, and a plurality of control leads as shown in FIG. 5 in the set of conductors 310, three of which OPCM, TRM AND SNCM are shown in FIG. 10. There are a plurality of control latches individual to each register junctor one for each of the control leads, control latches OPCL, TRL and SNCL being shown in FIG. 10.

Address conductors from the register timing generator supply the Z signals to select the time slots of the register junctors in sequence and control the multiplex circuits accordingly, each register junctor being scanned during its time slot and its control latches selectively set. The signals RTG-SRJ and RTG-RRJ determine the time interval during each time slot at which the latches may be set and reset. The signal on lead RTG-RRJ is true during coincidence of the signals Y1 and X2 which occurs near the beginning of a time slot, and the signal on lead RTG-SRJ is true during coincidence of the signals Y11 and X5 which occurs near the end of the time slot.

All of the control latches for a particular register junctor are reset near the beginning of its time slot in response to the signal on lead RTG-RRJ. The input control signals are from latches in the carry buffer circuit, which are selectively set at various times during the time slot in accordance with the logical processing. If, for example, the latch supplying lead RCB-OPC has been set during this time slot, then the true signal is supplied via the cable link to gate means, represented in FIG. 10 as gate 93. Near the end of the time slot the signal on lead RTG-SRJ enables gate 93 via 91. The output from gate 93 sets the latch OPCL, and its output via interface circuit 94 supplies the signal to lead OPCM, which in the register junctor of FIG. 10 via relay driver 1009 operates relay OP. The other control latches and control signals to the register junctor are similarly controlled. Thus it may be seen that if the logical conditions are such that the carry buffer latch is set in successive time slots for a particular register junctor, then the control signal to the register junctor is continuously true except during the time slot itself when the control latch is in the reset condition. This short interruption of the control signal does not affect the relays in the register junctor.

Multiplex To Senders And Receivers

The multiplex for senders and receivers and circuits associated therewith are shown in FIG. 6. The multiplex circuits themselves in unit RSM, and block 1201 of unit RIS-A are generally similar to the corresponding circuits of unit RJM and RIJ for the junctor multiplex, and therefore are indicated only by single blocks.

One MF sender out of a maximum of 36, one MF receiver out of a maximum of 36, and one DTMF receiver out of a maximum of 120 are shown in FIG. 12. The RSX unit is a single stage matrix comprising twenty-four 8 × 10 matrix switches, with three of the crosspoints of one matrix switch shown in FIG. 12 for connecting the register junctor RRJ-0 respectively to the MF sender, the MF receiver and the DTMF receiver shown.

As shown in detail in the MF sender, there is a relay 12A and a relay 12H. Relay 12A has two windings connected via resistors to the negative and ground terminals of the main battery, the other sides of the windings being connected respectively via break contacts of relay 12H to the tip and ring conductors via the crosspoint to the register junctor leads TX and RX. A signal on lead PGM from the multiplex circuits operates a relay driver 1233 which supplies ground potential initially for pulling the crosspoint relay, and then for holding it. The asterisk indicates make before break contacts for relay 12H. The ground potential drum relay driver 1233 via the lower break contacts of relay 12H, in conjunction with negative battery potential on lead PXR from the register junctor selects and pulls a crossoint relay. Relay 12A then operates via a path through the operated crosspoint contacts and a path in the register junctor. A path is then completed via the ground from relay 1233, make contacts of relay 12A, break contacts of relay 12H, the winding of relay 12H, and the hold winding of the crosspoint relay and a set of its contacts to battery potential. After the hold relay 12H operates, relay 12A is disconnected, and relay 12H via the ground from relay driver 1233 via its own make contacts and a resistor, holds itself and the crosspoint relay. Gates 1234 and 1235 are main battery test circuits which operate in response to detecting main battery negative potential to supply a true signal on their respective output leads. Each of the senders and receivers includes corresponding A and H relays and interface circuits similar to 1233, 1234 and 1235, indicated for the MF receiver and TCMF receiver by blocks.

The MF sender also includes a relay driver 1232 for operating relay TOP for the "time on period" of the tones during sending. The block 1231 indicates a set of relays controlled by relay drivers from the four leads MS1M through MS8M, to apply tones during sending from a tone source. Each digit is received in binary code on the four leads MS1M through MS8M and is converted to a code for applying two out of six tones via contacts of relay TOP and a transformer to the tip and ring leads, through the crosspoint connection to leads PX and RX at the register junctor.

For sending, the digit in binary coded decimal is received from a read buffer leads RRB–J1 through RRB–J4 and used via gates 1211 to 1214 to selectively set the appropriate ones of four latches MFDS1 through MFDS8. The outputs from these latches are coupled through the multiplex circuits of block 1201 and RSM to the four leads MS1M through MS8M of the selected sender. The tone on period is determined by bit G1 as indicated on lead RRB–G1, which in conjunction with the timing signal RTG SET DS via gate 1215 sets a latch TOP. The output of this latch via the multiplex circuits supply the signal to lead TOM of the selected sender. The signal RTG SET DS is true during coincidence of signals on leads Y11 and X4.

The pull ground for selecting the sender or receiver is controlled by bit I4 of word 1B of memory. The signal on lead RTG SET PG is enabled during coincidence of signals on leads Y9 and X4, and this signal in coincidence with the signal on lead RRB I4 via gate 1216 sets latch PG in FIG. 6. The output of this latch via the multiplex circuits is supplied to a lead PGM of a selected MF sender, lead PGMR of a selected MF receiver or lead PGTR of a selected DTMF receiver.

Whereas the addressing for the register junctor multiplex circuits is determined by the sequentially occurring time slot signals, those for the senders and receivers are determined by an address stored in memory as received from the data processing unit. This address in word 1A comprises a field AOG and SRA. The address appears in the read buffer during sub-time slots Y1 and Y9 of the time slot of the associated register junctor. During sub-time slot Y1 this address is transferred into a set of latches shown in FIG. 6, comprising three latches AOG1 through AOG4, only the output of latch AOG2 being shown; and seven latches SRA1 through SRA64, only the outputs of latches SRA2 through SRA32 being shown. The timing of the transfer is controlled by a latch SET SRA in the timing generator which is controlled by input gates during coincidence of signals on leads Y1 and X2 to be set in response to the signal on lead W6 and reset in response to the signal on W11. The output of this latch is supplied as an input to AND gates 1201 through 1210. The latches are then set selectively in accordance with the signals on leads RRB–C4 through RRB–F1. The output of the three AOG latches is decoded by circuit 1221, with only three of the possible output signals being decoded as RIS STC for selecting a DTMF receiver, RIS SMR for selecting an MF receiver, and RIS SMS for selecting an MF sender. The outputs of the SRA latches are decoded by circuits 1222 and 1223 to provide signals on eight leads RIS AAO through RIS AA7, and fifteen leads RIS ABO through RIS AB14 as shown. These signals select a specific sender or receiver within each group.

The latches in unit RIS are reset in response to a signal on lead RTG RST DL which is true during coincidence of signals on leads Y11 and X1.

Register Central Control

Figure 8:
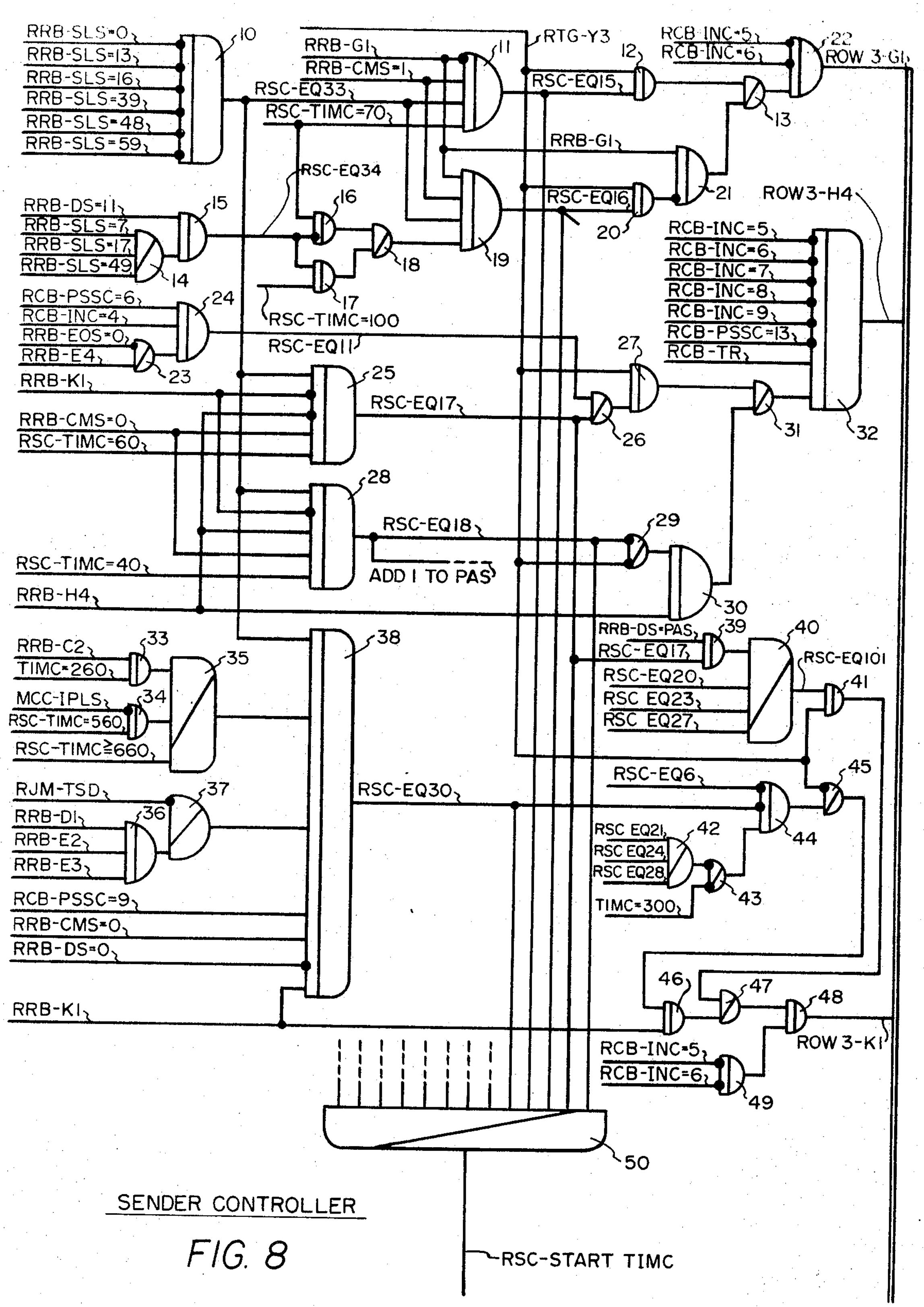
FIGS. 8 and 9, with FIG. 8 placed above FIG. 9, comprise a functional block diagram of a portion of the sender controller circuits.
Figure 9:
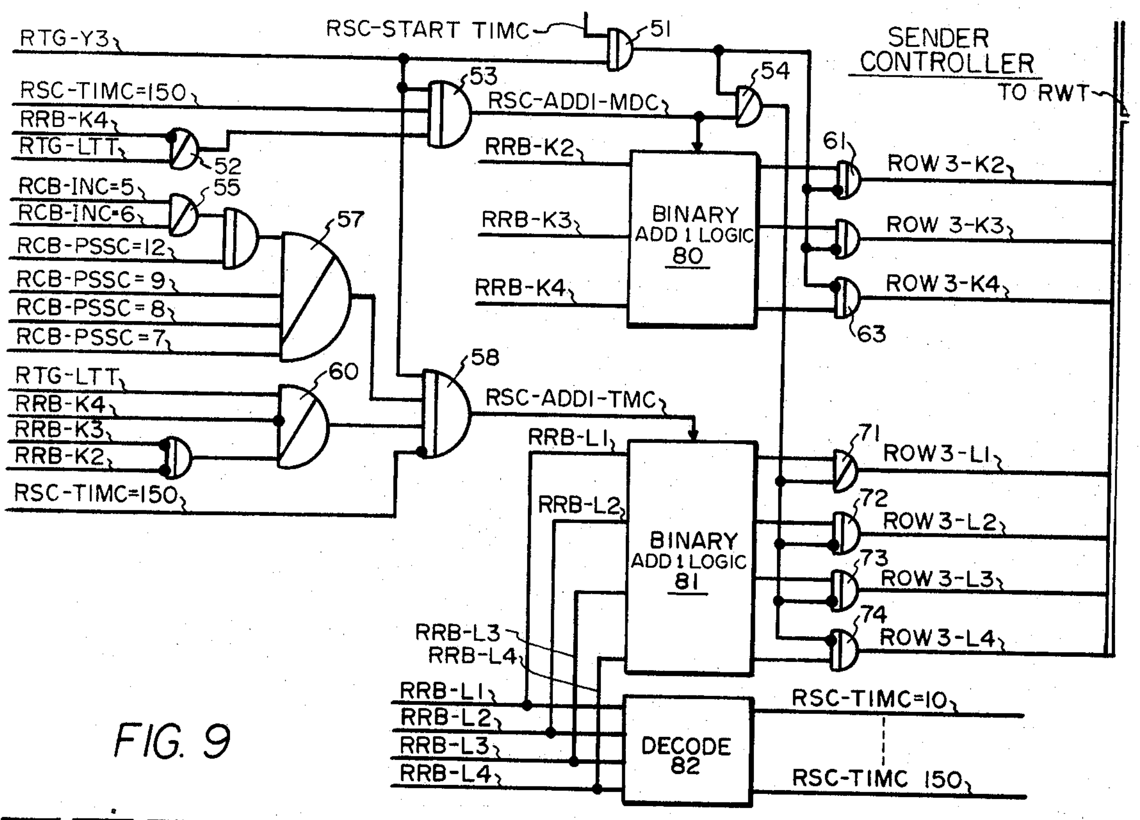

The register central control circuits of FIG. 4 have a few of the functions thereof shown by logic gate drawings in FIGS. 8 and 9; and are more fully described by Boolean equations in section K of the REGISTER-SENDER patent application.

The register read buffer RRB comprises 48 latches RRB–A1 through RRB–L4 corresponding to the 48 bits of a row of memory. Note that the output signals from the read buffer may be designated either by the name of the particular latch, or by the corresponding mnemonic in the memory word as shown in FIG. 7.

For the carry buffer RCB, FIG. 10 shows three of the latches, and the input signals thereto. Each of the carry buffer latches except RCB BY and RCB RQTC is set in response to the output of an AND gate such as gate 93 which has one input from lead RTG RCB SET, and another input from logic having inputs from the controllers of the circuits shown in FIG. 4. All of the carry buffer latches except RCB BY are reset in response to a signal on lead RTG RCB RESET. Note that the latches may be set during any time slot during the interval beginning with coincidence of X3 and W11 and ending with coincidence of X4 and W11; but are reset only at the beginning of a time slot during the interval with coincidence of Y1 and X1, beginning with W5 and ending with W9.

Sender Controller

The sender controller uses row 3 of a memory for each register, and logic of block RSC shown in FIG. 4, details of a portion of which are shown in FIGS. 8 and 9.

A timer C has a store in row 3 of memory comprising field TMC in bits L1–4 and MDC in bits K2–4. The common logic counters and other logic for timer C are shown in FIG. 9. In sub-time slots Y3 and Y11 the information from row 3 of memory is transferred into the register read buffer RRB and appears on signal leads RRB–A1 through RRB–L4. The timer C information on leads RRB–K2 through RRB–L4 is supplied as inputs to binary counters 80 and 81 for the MDC and TMC fields respectively, and at the same time is supplied to various other logic circuits in the sender controller. Normally the information in the counter is rewritten toward the end of sub-time slots Y3 and Y11 via the leads ROW3–K2 through ROW3–L4 and the write control circuit RWT. During sub-time slot Y3 if the signal on lead RSC-START-TIMC is true, then the gates 61-63 are inhibited, and via gate 54 gates 72–74 are inhibited to set the bits K2–K4 and L2–L4 to zero, and vio OR gate 71 the signal on lead ROW2–L1 is set to one, this condition being defined as restarting timer C.

Whenever the signal on lead RSC-ADD1-TMC from gate 58 is true, binary counter 81 causes the value of the digit in the TMC field L1–L4 to be incremented by one. Likewise when the signal on lead RSC-ADD1-MDC from gate 53 is true the binary counter 80 causes the MDC field in bits K2–K4 to be incremented by one. The initial incrementing of the counter following restarting occurs in field TMC in bits L1–L4. The counters may be incremented once per cycle, which is every ten milliseconds. Thus the value in field TMC when decoded and multiplied by ten gives the elapsed time in milliseconds. This is represented in FIG. 9 by decode circuits 82 with outputs RSC-TIMC=10 through RSC-TIMC=150. In the actual embodiment the decode circuits are provided throughout the sender controller as required, but are shown in FIG. 9 as a single block for convenience. The field MDC is incremented whenever the field TMC has reached its full count. After field MDC reaches the value in which bit K4 is true, the counters are both inhibited from advancing except during cycles in which the signal on lead RTG-LTT is true, which occurs during one cycle each second.

The field IPS in bit K1 of row 3 is used to indicate an interdigital pause for digit sending in the dial pulse mode.

The field DS in bits J1–4 of row 3 is used to store the digit that is currently being sent.

The field PAS in bits I1–4 of row 3 is the pulse accumulator for sending, and is used to count the number of dial pulses sent.

The field OP in bit H4 of row 3 is used to control the operation of the OP relay in the register junctor. The OP relay is used for DC signaling on the terminating transmission path (opening and closing the loop) e.g. sending in the dial pulse mode, holding terminating path, seizure of outgoing trunk.

The field RSS in bit H3 of row 3 indicates that some form of start dialing signaling has been received, meaning that sending may proceed.

The field SN in bit H2 of row 3 is used to control the operation of the SN relay in the register junctor. The SN relay is used to transfer the transmission path for the sender-receiver matrix from the receiving to the sending path in the register junctor. This bit is set during sender and receiver attachments and during sending when a sender is required.

Field ST in bit G4 of row 3 is used to control DC signaling on the terminating S lead through the selector matrix to the terminating junctor or outgoing trunk.

The field CMS in bits G2 and G3 of row 3 indicate the current mode of sending. The modes used are CMS=0 for dial pulse mode and CMS=1 for multifrequency mode.

The field TOP in bit G1 of row 3 is used during sending in the multifrequency mode. The TOP bit controls the application of the tones on the line by the MF sender. During MF sending the register-sender alternates the status of the TOP bit every 70 milliseconds thus generating the MF pulse train.

The field TSN in bit F4 of row 3 is a trouble indicator.

The field CTL in bit E4 of row 3 is used by the data processing unit to instruct the register-sender to close the terminating loop. The register-sender will close the terminating loop if CTL is set or if sending is required ($EOS \neq 0$).

The SLS field in bits D2–E3 of row 3 is the sender loading sequence state. Basically this field indicates which of the digits from rows 5, 6 and 7 is to be currently sent. The six prefix digits PR1–PR6 are sent in states seven to twelve using the mode of sending specified by the MS1 field.

The called number digits D1–D18 are sent in states 17 to 28 and 33 to 38 using the mode of sending specified by the MS2 field. The calling number N1–N10 is sent in states 49 to 58 using the mode of sending specified by the MS3 field.

Sequence states SLS=0, 16 and 48 are the states from which sending starts and are also the states where the change of sending mode takes place. Sequence states SLS=13, 39 and 59 are used as terminating sequence states or as branch points for skipping to other states.

The EOH field in bit D1 of word 3 is used by the data processor unit to instruct the register-sender to wait until a change to off-hook signal is received from a distant office before sending the calling number.

The SDM field in bits C3 and C4 of row 3 indicate the start dialing mode.

The IDS field in bit C2 of row 3 is used by the data processing unit to specify the length of the interdigital pause for sending in the dial pulse modes. The two values are IDS=1 for 300 milliseconds and IDS=0 for 600 or 700 milliseconds (strappable).

The field SKP in bit C1 of row 3 is the skip field to control the sequence in which the prefix digits, and the calling number are sent.

The MS fields in bits A1–B2 of row 3 indicate the mode of sending in which the prefix digits, the called number and the calling number are to be sent respectively. These values are transferred into field CMS at appropriate SLS sequence states.

The logic in the sender controller for controlling the writing or inhibiting of the TOP field in bit G1, the OP field in bit H4 and the IPS field in bit K1 of row 3 during sub-time slots Y3 and Y11 is shown in FIG. 8. This logic also supplies some of the inputs to OR gate 50 generating the signal on lead RSC-START-TIMC for stating or restarting timer C.

The reference to equation numbers in the drawings and description, such as RSC=EQ11 from gate 24 in FIG. 8, correspond to equations disclosed in section K of the REGISTER-SENDER patent application.

Operation For Call Processing

Call processing in the register-sender subsystem is explained in section L of the REGISTER-SENDER patent application with reference to the flow charts and equations disclosed therein. The various steps of call processing are controlled by processing sequence states designated PSS, stored in bits G1, G2, G3 and G4 of word 1B, as shown in FIG. 7. During sub-time slot Y1 the states of these four bits are transferred into four carry buffer latches designated PSSC, and the decoded outputs PSSC=0 through PSSC=15 supply the processing sequence state indication during other sub-time slots. Sending normally takes place during sequence state PSSC=9.

No digits are sent during the sending sequence states SLS=0, 13, 16, 39, 48 or 59; and all of these states being false is represented by the sender controller equation RSC–EQ33, shown as the output of gate 10 in FIG. 8. The condition represented by this equation is also designated function 1 or F1 in some of the equations. This condition is also shown in the flow chart of FIG. 1 as the second decision box, following an indication of state PSSC=9.

Sending for a typical outgoing call in state PSSC=9 may begin with the sender state SLS=0. The possible subsequent actions are shown on chart 32–1 and FIG. 32 of the REGISTER-SENDER patent application, and RSC equations 19, 20 and 21. All of the possibilities include enabling RSC equation 19 which causes writing CMS=MS1, starting timer C, and writing SLS=7.

At this time the digit is retrieved from the storage area and put into the DS field (bits J1–J4 of word 3B). The operation is shown on REGISTER-SENDER chart 35–1. There are four carry buffer latches DSC which are used as an intermediate store in transferring the digit.

Multifrequency Mode of Sending

For multifrequency sending a sender whose address is in the AOG and SRA fields of row 1 will have been connected during prior processing sequence states, one such connection being shown in FIG. 6 from the MF sender shown there via a crosspoint of matrix RSX and conductors 311 to the register junctor in FIG. 5. The CMS field in bits G2 and G3 has the value of CMS=1.

With CMS equal one, a signal on lead RTG SET DS which occurs during coincidence of timing signals of Y11 and X4, gates 1211–1214 in FIG. 6 are enabled to transfer the digits from the DS field via leads RRB–J1 through J4 into the four latches MFDS1, MFDS2, MFDS4 and MFDS8 of which the first and last are shown in FIG. 6. From these latches the signals are supplied via the multiplex circuits to the MF sender leads which at the sender are designated MS1M, MS2M, MS4M, and MS8M.

As shown on the flow chart of FIG. 1, with CMS=1, the condition TOP (time on period) is checked. If TOP is not true according to RSC equation 15 shown in FIG. 8 as the output of gate 11, there is a wait of 70 milliseconds and then TOP is written and the counter C is started. The condition TOP is the time on period for sending an MF digit. If the digit being sent during SLS=7 is an 11 (KP) it is left on for 100 milliseconds; and if not it is left on for 70 milliseconds as determined by RSC equation 16 shown in FIG. 8 as the output of gate 20. If the digit has the value 11 RSC equation 34 at the output of gate 15 is true, which inhibits gate 16 and enables gate 17 to use the timer C=100 millisecond output. Otherwise the timer C=70 millisecond output via gate 16 is used to enable gate 19. Equation 16 also clears the DS and PAS field, causes one to be added to the SLS state, and starts the timer C. This logic is shown on the flow chart of FIG. 1.

With SLS=8, the next digit is loaded as shown on the REGISTER-SENDER flow chart 35–1. This digit is sent in the same manner as the first digit, and in the same manner successive digits are loaded and sent.

Thus it is seen that during multifrequency sending the RSC equations 15 and 16 are alternately effective to inhibit and write the bit in row 3–G1, namely the TOP field for on-off control of the multifrequency pulse train. Whenever bit G1 is true, then the signal on lead RTG SET DS which occurs during coincidence of the timing signals Y11 and X4, via gate 1215 causes latch TOP in FIG. 6 to be set. This supplies the signal via the multiplex circuit which controls a latch therein corresponding to the control latches shown in the register junctor multiplex RJM, and the output of this latch supplies the signal on lead TOM which via relay driver 1232 controls relay TOP. The output of this relay connects the output of tone connect relays 1231 to the transmission path to the register junctor and thence to the terminating transmission path leads RT and TT. Note that at this time the signals TR and SN are also supplied by the register junctor multiplex to operate relays TR and SN in the register junctor circuit. At the same time the signals on the lead MS1M–MS8M operate the relays in block 1231 to supply the selected two tones out of a possible six.

Dial Pulse Mode of Sending

For dial pulse sending as indicated by the current mode of sending indication CMS=0 the first digit is loaded first into the carry buffer latches DSC and then into the memory field DS in bits J1–4 of row 3B, in the same manner as for multifrequency sending. At this time the condition OP continues to be true and therefore relay OP in the register junctor has been operated to close the outgoing loop via leads RT and TT. Note that OP was initially set during the processing sequence state PSSC=6, which is the state for interworking with the terminating marker. At this time the instruction from the data processing unit has a value of four, indicating working with the terminating marker — final path; and this instruction appears in the carry buffer as RCB-INC=4. Also since sending is to occur on this call the end of send field has a value other than zero so that the signal RRB-EOS=0 is false. Thus the RSC equation at the output of AND gate 24 is true which via OR gate 26 and AND gate 27 during sub-time slot Y3, and thence via gates 31 and 32 supplies the signal to lead ROW3–H4 to make the OP field true. This same condition also occurs in the case of multifrequency sending.

The generation of the dial pulse train is controlled by the RSC equations 17 and 18 shown in FIG. 8 as the outputs of AND gates 25 and 28, and represented in the flow chart of FIG. 1 at the righthand side. These equations control the OP field in bit H4 of row 3 as an on-off control indicator. Note that whenever the field OP is true it appears as the signal RRB–H4 at the lower input of gate 30 and is rewritten during sub-time slot Y3 via gates 31 and 32, unless inhibited at the upper input of gate 30. One condition for RSC equations 17 and 18 is RSC equation 33 true indicating that the sending sequence state is one in which a digit is to be sent, and not one of the starting or terminating states shown as inhibit inputs at gate 10 in FIG. 8, and as a decision block at the lefthand side of FIG. 1. Another input is RRB-CMS=0 indicating that the current mode of sending is dial pulse. Also for both of these equations the interdigital pulse field at bit RRB–K1 should be false. The OP field represented by bit RRB–H4 supplies an inhibit input at gate 25 and an enable input at gate 28, this bit being initially true. At the time of entering processing state PSSC=9, the timer C has been started, and when it reaches 40 milliseconds RSC equation 18 becomes true, thereby supplying an inhibit input via OR gate 29 to gate 30 to inhibit writing the OP field in bit H4 of row 3, and also supplying an input to gate 50 to restart the timer C, and supplying a signal to add one to PAS (pulse accumulator-sending), bits I1–4 of word 3. After 60 milliseconds RSC equation 17 becomes true to cause the writing of the field OP via gates 26, 27, 31 and 32, and restarting the timer C. The period during which OP is false is one break interval of a dial pulse digit. Successive break intervals are generated with "1" being added to PAS each time until DS=PAS, at which time RSC equation 17 in addition to writing OP and starting the timer C also enables RSC equation 101 to write IPS and RSC equation 120 to add one to SLS. RSC equation 101 is shown as the output of OR gate in FIG. 8, which has an input from AND gate 39. The condition RRB-DS-PAS is obtained from a set of exclusive OR gate circuits. The output from gate 40 is supplied via gates 41, 47 and 48 to write the interdigital pause signal field in ROW3–K1. The end of the interdigital pause is determined by RSC equation 30 shown as the output of gate 38 in FIG. 8. The condition IDS (interdigital speed for sending, bit C2 of word 3) determines the time of the interdigital pause. If it is true the total interdigital pause is 300 milliseconds (for sending to common control offices), which is 260 milliseconds from the last restart of the timer; and if IDS=0, the interdigital pause is 600 or 700 milliseconds (for sending to a S × S office) as determined by an MCC unit push-button or strap. Also at the time that DS=PAS indicating completion of sending the digit, RSC equation 12 causes the sending sequence state in the SLS field to be transferred into the corresponding carry buffer latches SLSC, and inhibits writing the DS and PAS fields. This equation is as follows:

$$(RCB\text{–}PSSC=9)\ (RSC\text{–}EQ33)\ (RRB\text{–}DS=PAS)\ (\overline{RCB\text{–}SPAR})\cdot[(RRB\text{–}CMS=0)\ (RRB\text{–}OP) + (RRB\text{–}CMS=1)\ (\overline{RRB\text{–}TOP})]$$

Another digit is now loaded first into the carry buffer latches DSC and then into the memory field DS. Loading of a digit makes the condition RRB–DS=0 not true which is one of the input equations for the RSC equation 30 to end the interdigital pause. As shown in FIG. 10 the carry buffer latch OPC follows the OP field being set via gates 80, 81 and 88 during sub-time slot Y11 whenever the bit RRB–H4 is true. This condition then via the multiplex circuits sets the latch OPCL in the multiplex circuits which is individual to the register junctor, and the output of this latch is supplied via lead OPCM to the register junctor to control the operation of the relay OP.

The carry buffer latches TR and SNC along with their input logic and corresponding multiplex circuits are also shown in FIG. 10 since these are conditions for operating relays in the sender during sending, as described in the REGISTER-SENDER patent application.

SUMMARY

As described above, during multifrequency sending the pulse train comprises on intervals of 70 miliseconds during which a digit is sent, and off intervals for the interdigital pause, controlled by the field TOP and timer C; and during dial pulse sending the pulse train comprises break intervals of 60 milliseconds and make intervals of 40 milliseconds for each pulse, controlled by the OP field and timer C, with an interdigital pause controlled by the IPS field and timer C.

Since each of the senders has its own timer field in memory, the cycle in which the pulse trains have their transition between the on and off intervals occur in multiplex cycles which are independently determined for each sender. Also the transition between on and off intervals occurs for each sender at its own time slot within the cycle further staggering the pulse trains. Therefore the pulse trains for the several senders are not synchronized to start and pulse at the same time. This arrangement also does not require distribution of a common generator output to all of the senders. It is simple and reliable.

What is claimed is:

1. In a communication switching system having a plurality of junctors, each including a line terminal for connection to a communication line to send call signals;

register-sender apparatus comprising a memory and logic circuits shared on a time division multiplex basis, said memory having sets of storage elements, a plurality of registers individually associated with said junctors, each register comprising a block with a given number of said sets including at least one sender control set;

sender means connected at least during a sending portion of a call to the junctor line terminal, the sender means including means for producing pulses with alternate on and off intervals at the junctor line terminal;

a multiplex arrangement comprising multiplex circuits coupling the logic circuits to the junctors and sender means, read and write circuits coupling the logic circuits to the memory, and a source of cyclically recurring pulses; with each register having an individual pulse time slot occurring once per cycle during which the logic circuits are effectively coupled via the multiplex circuits to the associated junctor and the sender means connected to its line terminal, wherein the information in the corresponding memory block is read via said read circuits, selectively modified, and written back into the block via said write circuits; whereby the logic circuits are common and used for each register only during its time slot;

wherein the sender control set of each register includes a timer store, a digit store, and an on-off control store;

wherein the logic circuits include a timing counter connected to act on timing information read from the timer store and with its output written into the timer store, with means to set the timing information to a starting value and means to increment the value at given periodic intervals, and the logic circuits including means to decode the timing information value to indicate elapsed time since last set to the starting value;

wherein the information in said on-off control store has alternate "on" and "off" values; and the logic circuits include means responsive to coincidence of given sending conditions, an "off" value of the on-off control information, and a first decoded value of the timing information to write the "on" value in the on-off control store and the starting value in the timer store; and means responsive to coincidence of said given sending conditions, an "on" value of the on-off control information, and a second decoded value of the timing information to write the "off" value in the on-off control store and the starting value in the timer store;

means in the logic circuits connected to receive the information read from the on-off control store to control a logic-circuit on-off storage means so that its state corresponds to the value of the on-off control information;

wherein said multiplex circuits include multiplex on-off storage means individual to the sender means, and means connected to the output of the logic-circuit on-off storage means to control the multiplex on-off storage means of each sender means during its time slot so that its state corresponds thereto and remains in that state during the remainder of that cycle; and a connection from the output of each multiplex on-off storage means to the associated sender means to control it to produce corresponding on nd off intervals.

2. In a communication switching system, the combination as claimed in claim 1 wherein said sender means comprises a multifrequency sender which includes means for generating multifrequency output signals, and a "time-on" relay for connecting the output to said junctor line terminal;

wherein said on-off control store is used as "time-on period" indicator, wherein digit signals read from said digit store are supplied via said multiplex circuits to the multifrequency sender to control the generation of output signals, and wherein said connection from the output of each miltiplex on-off storage means to the associated sender means to control it to produce corresponding on and off intervals comprises a connection to said "time-on period" relay to operate the relay for sending each multifrequency pulse, and to release the relay during each interdigital pause.

3. In a communication switching system, the combination as claimed in claim 1, wherein said sender means in each said junctor comprises an outpulsing relay having contacts connected to said junctor line terminal, wherein said on-off control store is used as an outpulsing indicator for controlling the outpulsing relay, wherein the sender control set of each register further includes a pulse accumulator store for counting pulses of a digit, and an interdigital pulse store for controlling the interdigital pulse time of an outpulsing pulse train;

wherein said logic circuits include means effective during each off interval of the on-off control store to add one to the pulse accumulator store information, means effective in response to the pulse accumulator store information being equal to said digit store information to set the interdigital pulse store information, and means responsive to the interdigital pulse store information being set to produce an on interval which ends in response to a third decoded value of the timing information;

wherein said connection from the output of each multiplex on-off storage means to the associated sender means to control it to produce corresponding on-off intervals comprises a connection to said outpulsing relay.

4. In a communication switching system, the combination as claimed in claim 1, wherein said sender control set of each register further includes a current-mode-of-sending store;

and wherein said combination includes a plurality of types of said sender means, each of which has different types of pulse trains, and wherein the current-mode-of-sending store determines the type of sender means used during a call and the consequent type of pulse train generated.

5. In a communication switching system, the combination as claimed in claim 4, wherein one of the modes which may be indicated by said current-mode-of-sending store is a multifrequency mode, with separate multifrequency and dial pulse on-off control stores;

wherein said sender means comprises a multifrequency sender which includes means for generating multifrequency output signals, and a "time-on" relay for connecting the output to said junctor line terminal;

wherein said on-off control store is used as a "time-on period" indicator, wherein digit signals read from said digit store are supplied via said multiplex circuit to the multifrequency sender to control the generation of output signals, and wherein said connection from the output of each multiplex on-off storage means to the associated sender means to control it to produce corresponding on and off intervals comprises a connection to said "time-on period" relay to operate the relay for sending each multifrequency pulse, and to release the relay during each interdigital pause;

wherein the multifrequency on-off control store is used as a "time-on period" indicator, wherein digit signals read from said digit store are supplied via said multiplex circuit to the multifrequency sender to control the generation of output signals, and wherein said connection from the output of each multiplex-on-off storage means to the associated sender means to control it to produce corresponding on and off intervals comprises a connection to said "time-on period" relays to operate the relay for sending each multifrequency pulse, and to release the relay during each interdigital pause.

6. In a communication switching system, the combination as claimed in claim 5, wherein one of the modes which may be indicated by said current mode of sending store is a dial pulse mode;

wherein said sender means in each said junctor comprises an outpulsing relay having contacts connected to said junctor line terminal, wherein said on-off control store is used as an outpulsing indicator for controlling the outpulsing relay, wherein the sender control set of each register further includes a pulse accumulator store for counting pulses of a digit, and an interdigital pulse store for controlling the interdigital pulse time of an outpulsing pulse train;

wherein said logic circuits include means effective during each off interval of the on-off control store to add one to the pulse accumulator store information, means effective in response to the pulse accumulator store information being equal to said digit store information to set the interdigital pulse store information, and means responsive to the interdigital pulse store information being set to produce an on interval which ends in response to a third decoded value of the timing information;

wherein said connection from the output of each multiplex on-off storage means to the associated sender means to control it to produce corresponding on-off intervals comprises a connection to said outpulsing relay;

wherein said logic circuits include means effective during each off interval of the dial pulse on-off control store to add one to the pulse accumulator store information, means effective in response to the pulse accumulator store information being equal to said digit store information to set the interdigital pulse store information, and means responsive to the interdigital store information being set to produce an on interval which ends in response to a third decoded value of the timing information;

wherein said connection from the output of each multiplex on-off storage means to the associated sender means to control it to produce corresponding on-off intervals comprises a connection to said outpulsing relay.

* * * * *

UNITED STATES PATENT OFFICE

CERTIFICATE OF CORRECTION

Patent No. 3,760,116 Dated September 18, 1973

Inventor(s) Gerald O'Toole & Sergio E. Puccini

It is certified that error appears in the above-identified patent and that said Letters Patent are hereby corrected as shown below:

Column 2, line 36, after "Nov. 24, 1971" insert--, now patent No. 3,737,873 issued June 5, 1973, --

Signed and sealed this 19th day of February 1974.

(SEAL)
Attest:

EDWARD M.FLETCHER,JR.
Attesting Officer

C. MARSHALL DANN
Commissioner of Patents

USCOMM-DC 60376-P69
☆ U.S. GOVERNMENT PRINTING OFFICE : 1969 O—366-334.